(12) United States Patent
Harris et al.

(10) Patent No.: US 8,849,935 B1
(45) Date of Patent: Sep. 30, 2014

(54) SYSTEMS AND METHOD FOR GENERATING THREE-DIMENSIONAL GEOFEEDS, ORIENTATION-BASED GEOFEEDS, AND GEOFEEDS BASED ON AMBIENT CONDITIONS BASED ON CONTENT PROVIDED BY SOCIAL MEDIA CONTENT PROVIDERS

(71) Applicants: Philip B. Harris, Naples, FL (US); Scott K. Mitchell, Naples, FL (US); Michael J. Mulroy, Glencoe, IL (US)

(72) Inventors: Philip B. Harris, Naples, FL (US); Scott K. Mitchell, Naples, FL (US); Michael J. Mulroy, Glencoe, IL (US)

(73) Assignee: Geofeedia, Inc., Naples, FL (US)

( * ) Notice: Subject to any disclaimer, the term of this patent is extended or adjusted under 35 U.S.C. 154(b) by 0 days.

(21) Appl. No.: 13/843,832

(22) Filed: Mar. 15, 2013

(51) Int. Cl.
*G06F 15/16* (2006.01)
*H04L 29/08* (2006.01)

(52) U.S. Cl.
CPC .................................... *H04L 67/18* (2013.01)
USPC ............................. 709/206; 709/205; 709/217

(58) Field of Classification Search
CPC ....................................................... H04L 67/18
USPC .................................. 709/202–207, 217–219
See application file for complete search history.

(56) References Cited

U.S. PATENT DOCUMENTS

| | | | |
|---|---|---|---|
| 6,363,320 B1 | 3/2002 | Chou | 701/207 |
| 7,522,940 B2 * | 4/2009 | Jendbro et al. | 709/203 |
| 7,698,336 B2 | 4/2010 | Nath | 707/737 |
| 7,912,451 B2 * | 3/2011 | Eckhart | 709/203 |
| 8,103,741 B2 | 1/2012 | Frazier et al. | 709/217 |
| 8,341,223 B1 | 12/2012 | Patton et al. | 709/204 |
| 8,428,228 B1 | 4/2013 | Baxter, Jr. | 379/88.14 |
| 8,484,224 B1 | 7/2013 | Harris et al. | 707/748 |
| 8,595,317 B1 | 11/2013 | Harris et al. | 709/213 |
| 8,612,533 B1 | 12/2013 | Harris et al. | 709/206 |
| 8,639,767 B1 | 1/2014 | Harris et al. | 709/207 |
| 8,655,873 B2 | 2/2014 | Mitchell et al. | 707/724 |
| 8,655,983 B1 | 2/2014 | Harris et al. | 709/217 |

(Continued)

FOREIGN PATENT DOCUMENTS

| | | |
|---|---|---|
| EP | 1 045 345 | 10/2000 |
| WO | WO 99/15995 | 4/1999 |

(Continued)

OTHER PUBLICATIONS

U.S. Appl. No. 13/284,455, a non-final Office Action, mailed Jun. 4, 2013, 28 pages.

(Continued)

*Primary Examiner* — Bharat N Barot
(74) *Attorney, Agent, or Firm* — Pillsbury Winthrop Shaw Pittman LLP

(57) ABSTRACT

A system and method for generating a geofeed based on one or more geofeed parameters including altitude parameters, ambient condition parameters, and orientation parameters is provided. A geofeed includes a collection of content, aggregated from various content providers, that is relevant to one or more geographically definable locations. The generated content may include, for example, video, audio, images, text, hyperlinks, and/or other content that may be relevant to a geographically definable location. The content providers may include, for example, social media platforms, online knowledge databases, individual content creators, and/or other providers that can distribute content that may be relevant to a geographically definable location. The system may filter content into the geofeed and/or out of the geofeed based on one or more geofeed parameters and/or display the geofeed comprising the filtered content.

30 Claims, 7 Drawing Sheets

(56) References Cited

U.S. PATENT DOCUMENTS

| | | |
|---|---|---|
| 2002/0029226 A1 | 3/2002 | Li et al. .................. 707/104.1 |
| 2003/0088609 A1 | 5/2003 | Guedalia et al. ............. 709/107 |
| 2004/0203854 A1 | 10/2004 | Nowak ...................... 455/456.1 |
| 2004/0225635 A1 | 11/2004 | Toyama et al. ................... 707/1 |
| 2005/0034074 A1 | 2/2005 | Munson et al. ............... 715/712 |
| 2006/0002317 A1 | 1/2006 | Punaganti Venkata ....... 370/310 |
| 2006/0184968 A1* | 8/2006 | Clayton et al. ................... 725/56 |
| 2006/0200305 A1 | 9/2006 | Sheha et al. ................. 701/200 |
| 2007/0112729 A1 | 5/2007 | Wiseman et al. ................... 707/3 |
| 2007/0121843 A1 | 5/2007 | Atazky et al. ............ 379/114.13 |
| 2007/0143345 A1 | 6/2007 | Jones et al. ................. 707/104.1 |
| 2007/0210937 A1 | 9/2007 | Smith et al. ................ 340/995.1 |
| 2007/0276919 A1 | 11/2007 | Buchmann et al. ........... 709/217 |
| 2008/0092054 A1 | 4/2008 | Bhumkar et al. ............. 715/739 |
| 2008/0104019 A1 | 5/2008 | Nath ............................... 707/3 |
| 2008/0192934 A1 | 8/2008 | Nelger et al. ................. 380/258 |
| 2008/0250031 A1 | 10/2008 | Ting et al. ..................... 707/100 |
| 2009/0005968 A1 | 1/2009 | Vengroff et al. .............. 701/202 |
| 2009/0102859 A1 | 4/2009 | Athsani et al. ................ 345/619 |
| 2009/0132435 A1 | 5/2009 | Titus et al. .................... 705/400 |
| 2009/0138497 A1 | 5/2009 | Zavoli et al. .................. 707/102 |
| 2009/0300528 A1 | 12/2009 | Stambaugh ................... 715/764 |
| 2010/0076968 A1 | 3/2010 | Boyns et al. .................. 707/732 |
| 2010/0145947 A1 | 6/2010 | Kolman et al. ............... 707/736 |
| 2010/0149399 A1 | 6/2010 | Mukai et al. ............. 348/333.02 |
| 2010/0153386 A1 | 6/2010 | Tysowski ...................... 707/736 |
| 2010/0153410 A1 | 6/2010 | Jin et al. ........................ 707/758 |
| 2011/0007941 A1 | 1/2011 | Chen et al. .................... 382/103 |
| 2011/0010674 A1 | 1/2011 | Knize et al. ................... 715/849 |
| 2011/0078584 A1 | 3/2011 | Winterstein et al. .......... 715/751 |
| 2011/0083013 A1 | 4/2011 | Nice et al. ..................... 713/168 |
| 2011/0113096 A1 | 5/2011 | Long et al. .................... 709/204 |
| 2011/0123066 A9 | 5/2011 | Chen et al. .................... 382/103 |
| 2011/0131496 A1* | 6/2011 | Abram et al. ................. 715/722 |
| 2011/0142347 A1 | 6/2011 | Chen et al. .................... 382/190 |
| 2011/0288917 A1 | 11/2011 | Wanek et al. ................ 705/14.5 |
| 2012/0001938 A1* | 1/2012 | Sandberg ...................... 345/633 |
| 2012/0047219 A1 | 2/2012 | Feng et al. .................... 709/207 |
| 2012/0078503 A1 | 3/2012 | Dzubay et al. ................ 701/410 |
| 2012/0084323 A1 | 4/2012 | Epshtein et al. .............. 707/776 |
| 2012/0150901 A1 | 6/2012 | Johnson et al. ............... 707/769 |
| 2012/0166367 A1 | 6/2012 | Murdock et al. ................ 706/12 |
| 2012/0212398 A1 | 8/2012 | Border et al. ...................... 345/8 |
| 2012/0221687 A1 | 8/2012 | Hunter et al. ................. 709/219 |
| 2012/0254774 A1 | 10/2012 | Patton ............................ 715/758 |
| 2012/0259791 A1 | 10/2012 | Zoidze .......................... 705/319 |
| 2012/0276848 A1 | 11/2012 | Krattiger et al. ............. 455/41.2 |
| 2012/0276918 A1 | 11/2012 | Krattiger et al. ........... 455/456.1 |
| 2012/0323687 A1 | 12/2012 | Schuster et al. ........... 705/14.57 |
| 2012/0330959 A1 | 12/2012 | Kretz et al. .................... 707/739 |
| 2013/0018957 A1 | 1/2013 | Parnaby et al. ............... 709/204 |
| 2013/0073388 A1 | 3/2013 | Heath ......................... 705/14.53 |
| 2013/0073631 A1 | 3/2013 | Patton et al. .................. 709/204 |
| 2013/0110631 A1 | 5/2013 | Mitchell et al. ............ 705/14.58 |
| 2013/0150015 A1 | 6/2013 | Valko et al. ................... 455/418 |
| 2013/0159463 A1 | 6/2013 | Bentley et al. ................ 709/217 |
| 2013/0238599 A1 | 9/2013 | Burris ............................ 707/722 |
| 2013/0238652 A1 | 9/2013 | Burris ............................ 707/769 |
| 2013/0238658 A1 | 9/2013 | Burris ............................ 707/770 |
| 2013/0268558 A1 | 10/2013 | Burris ............................ 707/770 |
| 2013/0346563 A1* | 12/2013 | Huang ........................... 709/219 |
| 2014/0089296 A1 | 3/2014 | Burris ............................ 707/722 |
| 2014/0089343 A1 | 3/2014 | Burris et al. .................. 707/770 |
| 2014/0089461 A1 | 3/2014 | Harris, et al. .................. 709/219 |
| 2014/0095509 A1 | 4/2014 | Patton ............................ 707/740 |
| 2014/0164368 A1 | 6/2014 | Mitchell et al. ............... 707/724 |

FOREIGN PATENT DOCUMENTS

| | | |
|---|---|---|
| WO | WO 2010/049918 | 5/2010 |
| WO | WO 2013/133870 | 9/2013 |
| WO | WO 2013/134451 | 9/2013 |

OTHER PUBLICATIONS

U.S. Appl. No. 13/708,516, a Notice of Allowance, mailed Jun. 7, 2013, 14 pages.

U.S. Appl. No. 13/619,888, a Notice of Allowance, mailed Jul. 9, 2013, 10 pages.

U.S. Appl. No. 13/788,760, a Notice of Allowance, mailed Jul. 26, 2013, 12 pages.

U.S. Appl. No. 13/788,843, a non-final Office Action, mailed Aug. 5, 2013, 17 pages.

U.S. Appl. No. 13/788,909, a non-final Office Action, mailed Aug. 12, 2013, 17 pages.

U.S. Appl. No. 13/843,949, a non-final Office Action, mailed Aug. 29, 2013, 12 pages.

U.S. Appl. No. 13/284,455, a non-final Office Action, mailed Jan. 7, 2013, 18 pages.

U.S. Appl. No. 13/619,888, a non-final Office Action, mailed Mar. 1, 2013, 15 pages.

U.S. Appl. No. 13/708,466, a non-final Office Action, mailed Apr. 17, 2013, 15 pages.

U.S. Appl. No. 13/708,516, a non-final Office Action, mailed May 15, 2013, 11 pages.

U.S. Appl. No. 13/708,404, a Notice of Allowance, mailed May 24, 2013, 12 pages.

Chow et al., "Towards Location-Based Social Networking Services", *LBSN 2010 Proceedings of the 2nd ACM SIGSPATIAL International Workshop on Location Based Social Networks*, Nov. 2, 2010, pp. 31-38.

Bao, Jie, et al., "GeoFeed: A Location-Aware News Feed System", *IEEE Xplore® Digital Library*, Published in 2012 *IEEE 28th International Conference on Data Engineering*, Apr. 1-5, 2012, 14 pages.

Sarwat, Mohamed, et al., "Sindbad: A Location-Based Social Networking System", *SIGMOD'12*, Scottsdale, Arizona, May 20-24, 2012, 4 pages.

U.S. Appl. No. 13/708,466, a Notice of Allowance issued by Examiner Nicholas R. Taylor, mailed Sep. 3, 2013, 11 pages.

U.S. Appl. No. 13/284,455, a Notice of Allowance issued by Examiner Augustine Kunle Obisesan, mailed Oct. 4, 2013, 17 pages.

U.S. Appl. No. 13/788,843, a final Office Action issued by Examiner Michael K. Tamaru, mailed Jan. 21, 2014, 25 pages.

U.S. Appl. No. 13/788,909, a Notice of Allowance issued by Examiner Shanto Abedin, mailed Jan. 24, 2014, 12 pages.

U.S. Appl. No. 13/843,949, a Notice of Allowance issued by Examiner Joshua Bullock, mailed Feb. 3, 2014, 11 pages.

Amitay et aL, "Web-a-Where: Geotagging Web Content", *Proceedings of the 27th Annual International ACM SIGIR Conference on Research and Development in Information Retrieval (SIGIR)*, 2004, pp. 273-280.

U.S. Appl. No. 13/843,949, a Notice of Allowance issued by Examiner Joshua Bullock, mailed May 9, 2014, 10 pages.

U.S. Appl. No. 13/788,909, a Notice of Allowance issued by Examiner Shanto Abedin, mailed Jun. 24, 2014, 11 pages.

U.S. Appl. No. 14/089,631, a non-final Office Action issued by Examiner Djenane M. Bayard, mailed Jul. 8, 2014, 21 pages.

U.S. Appl. No. 14/180,473, a non-final Office Action issued by Examiner Djenane M. Bayard, mailed Jul. 8, 2014, 18 pages.

\* cited by examiner

SYSTEMS AND METHOD FOR GENERATING THREE-DIMENSIONAL GEOFEEDS, ORIENTATION-BASED GEOFEEDS, AND GEOFEEDS BASED ON AMBIENT CONDITIONS BASED ON CONTENT PROVIDED BY SOCIAL MEDIA CONTENT PROVIDERS

FIELD OF THE INVENTION

The disclosure relates to systems and methods for generating three-dimensional geofeeds, orientation-based geofeeds, and geofeeds based on ambient conditions, where the geofeed comprises content that is related to geographically definable locations and is aggregated from a plurality of social media or other content providers.

BACKGROUND OF THE INVENTION

The availability of content such as videos, audio files, photos, text, and/or other content over networks such as the Internet has grown at impressive rates. Many Internet and other online service providers make this type of content available to enable users to post and share such content through their services. However, various limitations exist with respect to how this vast amount of information can be effectively monitored and/or selectively displayed.

Because of the large amount of information available from social networks and other information providers, organizing, and displaying the organized content in a meaningful way can be difficult.

SUMMARY OF THE INVENTION

The disclosure relates to systems and methods for generating a geofeed based on one or more geofeed parameters including altitude parameters, ambient condition parameters, and orientation parameters, where the geofeed comprises content that is related to geographically definable locations and is aggregated from a plurality of social media or other content providers.

In some embodiments, the system may include a computer that facilitates generating a geofeed based on one or more geofeed parameters. The computer may include one or more processors configured to perform some or all of a functionality of a plurality of modules. For example, the one or more processors may be configured to execute a geofeed creation module, an altitude module, an ambient condition module, an orientation module, a communication module, a user interface module, and/or other modules.

The geofeed creation module may be configured to receive a request to create a geofeed based on a specification of one or more geo-locations. The request may include one or more geofeed parameters which may include an altitude parameter (e.g., at a certain altitude, within a certain altitude range, below/above a certain altitude, etc.), an ambient condition parameter (e.g., at a certain temperature, within a certain temperature range, below/above a certain temperature, etc.), and an orientation parameter (e.g., "facing Southeast," "Azimuth of 125 degrees," "facing the White House," etc.), and/or other parameters. The one or more geofeed parameters may be used to filter content into the geofeed and/or out of the geofeed.

The geofeed creation module may generate a geofeed definition that includes the specification of the one or more geo-locations, the one or more geofeed parameters, and/or other information related to the geofeed. The geofeed definition may be updated. For example, the specification of the one or more geo-locations, the one or more geofeed parameters, and/or other information of the geofeed definition may be updated. In this manner, various parameters related to geofeeds may be defined or updated at the time of specifying the geofeeds and/or after the geofeeds have been specified.

To create the geofeed, the geofeed creation module may obtain the specification of the one or more geo-locations from the geofeed definition and generate requests that specify the one or more geo-locations specifically for individual ones of the plurality of content providers. In some embodiments, the geofeed creation module may create a single geofeed having a plurality of geo-locations that are grouped with respect to one another. In other embodiments, the geofeed creation module may create multiple distinct geofeeds, which may each be associated with one or more geo-locations that are grouped with respect to one another. In these embodiments, each set of individual content may correspond to a single geofeed.

The altitude module may be configured to identify and/or obtain one or more altitude parameters that specify one or more altitude attributes related to content. An altitude parameter may be specified in various forms. It may be defined as a value of a particular altitude (e.g., at 50 feet), as an altitude range (e.g., from 50 feet to 100 feet), and/or as a minimum/maximum altitude (e.g., below/above 50 feet).

In some implementations, a content provider may determine or otherwise provide one or more altitude attributes associated with content. In this manner, the content provided by the content provider and received by the computer may already have altitude attributes embedded in the content. One or more altitude attributes may be generated and/or embedded into the content by obtaining altitude data from a device equipped with a barometric pressure sensor and/or based on user input.

In some implementations, a content provider may not determine or otherwise provide one or more altitude attributes associated with content. In other words, the computer may receive from the content provider the content not yet associated with an altitude attribute. In such a case, the altitude module may be configured to determine one or more altitude attributes related to the content.

In some implementations, the altitude module may determine the one or more altitude attributes related to the content based on a correlation between the content and other content that are currently associated with one or more altitude attributes. In some implementations, the altitude module may determine the one or more altitude attributes related to the content based on address information where the address information may identify a particular floor level of a building on which the place is located.

The ambient condition module may be configured to identify and/or obtain one or more ambient condition parameters that specify one or more ambient condition attributes related to content. Ambient conditions may include weather-related information such as temperature, humidity, air pressure, wind velocity and/or other environmental conditions. An ambient condition parameter may be specified in various forms. It may be defined as a value of a particular ambient condition (e.g., temperature of 90° F.), as a range (e.g., from 30° F. to 40° F.), and/or as a minimum/maximum threshold (e.g., below/above 90° F.).

In some implementations, a content provider may determine or otherwise provide one or more ambient condition attributes associated with content. In this manner, the content provided by the content provider and received by the computer may already have ambient condition attributes embedded in the content. One or more ambient condition attributes may be generated and/or embedded into the content by obtaining ambient condition data from a device equipped with one or more sensors, by querying an external database based on one or more geo-locations and/or a creation/update time of the content, and/or based on user input.

In some implementations, a content provider may not determine or otherwise provide one or more ambient condition attributes associated with content. The computer may receive from the content provider the content not yet associated with an ambient condition attribute. In such a case, the ambient condition module may be configured to determine one or more ambient condition attributes related to the content by accessing an external database based on geo-locations and/or a creation/update time of the content.

The orientation module may be configured to identify and/or obtain one or more orientation parameters that specify one or more orientation attributes related to the content. For example, a content consumer may request a geofeed having content that was created with respect to a particular spatial orientation. An orientation parameter may be specified in various forms. It may be defined as a reference point from which content was created. The reference point may include a particular point of interest (e.g., "facing the White House"), a particular reference direction (e.g., "facing Southeast"), and/or a particular azimuth value (e.g., "Azimuth of 125 degrees").

In some implementations, a content provider may determine or otherwise provide one or more orientation attributes associated with content. In this manner, the content provided by the content provider and received by the computer may already have orientation attributes embedded in the content. One or more orientation attributes may be generated and/or embedded into the content by obtaining orientation data from a device equipped with a GPS unit and a compass and/or accelerometer/tilt angle sensor, and/or based on user input.

In some implementations, a content provider may not determine or otherwise provide one or more orientation attributes to be associated with content. The computer may receive from the content provider the content not yet associated with an orientation attribute. In such a case, the orientation module may be configured to determine one or more orientation attributes related to the content based on analyzing the content and determining whether the content itself indicates a particular reference point.

The communication module may be configured to communicate the geofeed comprising the content that is associated with one or more altitude attributes, ambient condition attributes, and/or orientation attributes, and/or other attributes that meet the criteria defined by the one or more geofeed parameters. The geofeed may be communicated to the content consumer via the user interface communicated via the user interface module and/or other communication channel.

Various other objects, features, and advantages of the invention will be apparent through the detailed description of the preferred embodiments and the drawings attached hereto. It is also to be understood that both the foregoing general description and the following detailed description are exemplary and not restrictive of the scope of the invention.

DETAILED DESCRIPTION OF THE INVENTION

Figure 1:
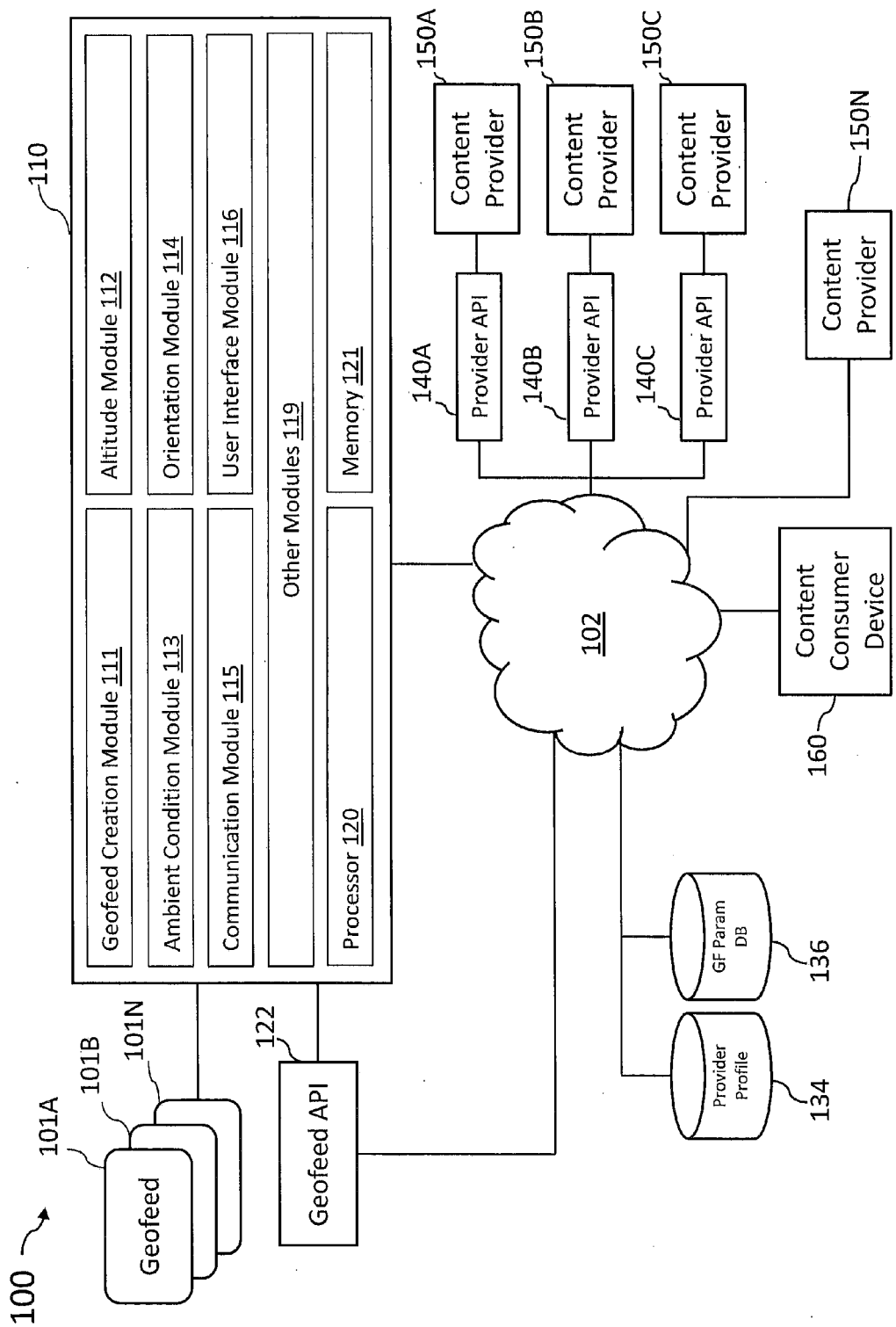
FIG. 1 illustrates a system of generating a geofeed based on one or more geofeed parameters including altitude parameters, ambient condition parameters, and orientation parameters, according to an aspect of the invention.

FIG. 1 illustrates a system 100 of generating a geofeed based on one or more geofeed parameters including altitude parameters, ambient condition parameters, and orientation parameters, according to an aspect of the invention. A geofeed includes a collection of content, aggregated from various content providers, that is relevant to a geographically definable location (hereinafter, a "geo-location"). The aggregated content (also referred to herein as "geofeed content") may include, for example, video, audio, images, text, hyperlinks, and/or other content that may be relevant to a geo-location.

The content providers may include, for example, social media platforms (e.g., FACEBOOK, TWITTER, INSTAGRAM, FLICKR, etc.), online knowledge databases, and/or other providers that can distribute content that may be relevant to a geo-location. The geo-location may be specified by a boundary, geo coordinates (e.g., latitude, longitude, altitude/depth), an address, a school, a place name, a point of interest, a zip code, a city, a state, a country, and/or other information that can spatially identify an area. The content may be generated by content sources such as individuals, corporations, and/or other entities that may create content. As used hereinafter, "a location," "a geo-location," "a geographically definable location," and similar language is not limited to a single location but may also refer to one or more such locations.

In many instances the created content can be automatically tagged with information such as user identifications, date/time information or geographic information (e.g., hereinafter, a "geo-tag") that specifies a location where the content was created. For example, cameras equipped with Global Positioning Satellite ("GPS") units or other location-aware systems may embed into an image file latitude/longitude coordinates that indicate where a picture was taken. In addition, modern hand-held devices such as smartphones may be equipped with a GPS sensor, which allows users to generate content (text, photos and videos) with their devices and immediately share the content through a plurality of social networks. Moreover, some devices allow users to manually input the foregoing and other information for embedding into the content. Furthermore, editing software may allow a user to embed or otherwise associate information along with the content after the content was created.

System 100 may include a computer 110, a geofeed API 122, a content consumer device 160, provider APIs 140, content providers 150, and/or other components. In some implementations, computer 110 may include one or more processors 120 configured to perform some or all of a functionality of a plurality of modules, which may be stored in a memory 121. For example, the one or more processors may be configured to execute a geofeed creation module 111, an altitude module 112, an ambient condition module 113, an orientation module 114, a communication module 115, a user interface module 116, and/or other modules 119.

Geofeed creation module 111 may be configured to create one or more geofeeds 101 (illustrated in FIG. 1 as geofeed 101A, 101B, . . . , 101N), as described in U.S. patent application Ser. No. 13/284,455, filed Oct. 28, 2011, entitled "SYSTEM AND METHOD FOR AGGREGATING AND DISTRIBUTING GEOTAGGED CONTENT," and U.S. patent application Ser. No. 13/619,888, filed Sep. 14, 2012 (issued on Nov. 6, 2013 as U.S. Pat. No. 8,595,317), entitled "SYSTEM AND METHOD FOR GENERATING, ACCESSING, AND UPDATING GEOFEEDS" both of which are incorporated by reference herein in their entirety.

Co-pending U.S. patent application Ser. No. 13/708,516, filed Dec. 7, 2012, entitled "SYSTEM AND METHOD FOR LOCATION MONITORING BASED ON ORGANIZED GEOFEEDS," co-pending U.S. patent application Ser. No. 13/708,466, filed Dec. 7, 2012, entitled "SYSTEM AND METHOD FOR GENERATING AND MANAGING GEO-FEED-BASED ALERTS," co-pending U.S. patent application Ser. No. 13/708,404 (issued on Jul. 9, 2013 as U.S. Pat. No. 8,484,224), filed Dec. 7, 2012, entitled "SYSTEM AND METHOD FOR RANKING GEOFEEDS AND CONTENT WITHIN GEOFEEDS," co-pending U.S. patent application Ser. No. 13/788,843, filed Mar. 7, 2013, entitled "SYSTEM AND METHOD FOR DIFFERENTIALLY PROCESSING A LOCATION INPUT FOR CONTENT PROVIDERS THAT USE DIFFERENT LOCATION INPUT FORMATS," U.S. patent application Ser. No. 13/788,760, filed Mar. 7, 2013, entitled "SYSTEM AND METHOD FOR CREATING AND MANAGING GEOFEEDS," and U.S. patent application Ser. No. 13/788,909, filed Mar. 7, 2013, entitled "SYSTEM AND METHOD FOR TARGETED MESSAGING, WORKFLOW MANAGEMENT, AND DIGITAL RIGHTS MANAGEMENT FOR GEOFEEDS," are all incorporated by reference in their entireties herein.

Co-pending patent application, filed concurrently herewith, entitled "SYSTEM AND METHOD FOR PREDICTING A GEOGRAPHIC ORIGIN OF CONTENT AND ACCURACY OF GEOTAGS RELATED TO CONTENT OBTAINED FROM SOCIAL MEDIA AND OTHER CONTENT PROVIDERS," U.S. patent application Ser. No. 13/668,690 and co-pending provisional patent application, filed concurrently herewith, entitled "VIEW OF A PHYSICAL SPACE AUGMENTED WITH SOCIAL MEDIA CONTENT ORIGINATING FROM A GEO-LOCATION OF THE PHYSICAL SPACE," U.S. Provisional Patent Application No. 61/800,951, are all incorporated by reference in their entireties herein.

Geofeed creation module 111 may format a request for a geofeed specific for different provider APIs 140 (illustrated in FIG. 1 as API 140A, 140B, . . . , 140N). The provider APIs may facilitate receiving content from corresponding content providers 150 (illustrated in FIG. 1 as content providers 150A, 150B, 150C). In some implementations, geofeed creation module 111 may format a request directly for content provider 150N without using a corresponding API. Formatting instructions may be stored at a provider profile 134. A content consumer device 160 may request and view geofeeds 101 created by geofeed creation module 111.

In some implementations, geofeed creation module 111 may receive a request to create a geofeed based on a specification of one or more geo-locations. The request may include one or more geofeed parameters which may include an altitude parameter (e.g., at a certain altitude, within a certain altitude range, below/above a certain altitude, etc.), an ambient condition parameter (e.g., at a certain temperature, within a certain temperature range, below/above a certain temperature, etc.), and an orientation parameter (e.g., "facing Southeast," "Azimuth of 125 degrees," "facing the White House," etc.), and/or other parameters. For example, a content consumer may search for geofeed content that have been created when the temperature of that location of creation was over 90 degrees Fahrenheit (° F.). The request may include a plurality of geofeed parameters in some instances. For example, a content consumer may be interested in receiving geofeed content that have been created at a certain specified altitude below a certain specified temperature. The geofeed parameters which accompany the request may be used to request from content providers content that satisfies both of the geofeed parameters. On the other hand, the geofeed parameters may be used to filter content into the geofeed and/or out of the geofeed after computer 110 receives the content from content providers.

In some implementations, geofeed creation module 111 may obtain the one or more geofeed parameters after computer 110 receives the geofeed content from content providers. For example, once the geofeed content related to one or more geo-locations have been retrieved, a content consumer may specify, via a user interface, an altitude parameter (e.g., at 50 feet of altitude), an ambient condition parameter (e.g., above 90° F.), an orientation parameter (e.g., facing the "White House"), and/or other parameters to filter content into the geofeed and/or out of the geofeed.

In some implementations, the geofeed parameters including altitude parameters, ambient condition parameters, orientation parameters, and/or other parameters may be stored in and/or retrieved from geofeed parameters database 136.

Altitude module 112 may be configured to identify and/or obtain one or more altitude parameters that specify one or more altitude attributes related to content. The one or more altitude parameters may be user-specified and/or system-generated. For example, a content consumer may specify an altitude parameter to search for geofeed content that is associated with one or more altitude attributes that meet the criteria defined by the altitude parameter.

An altitude parameter may be specified in various forms. It may be defined as a value of a particular altitude (e.g., at 50 feet), as an altitude range (e.g., from 50 feet to 100 feet), and/or as a minimum/maximum altitude (e.g., below/above 50 feet). In some implementations, altitude parameters may be defined based on a map input. For example, a content consumer may specify a three-dimensional geo-location via a map interface by drawing a circle, cylinder, or sphere above (or below) ground level. In other implementations, an altitude parameter may be specified as a text input by entering a particular altitude value, altitude range, altitude threshold, etc.

In some implementations, an altitude parameter may include one or more keywords, phrases, addresses, and/or other information that may be used to identify an altitude. For example, if an altitude parameter includes a phrase such as "at the highest point of Washington D.C.," altitude module 112 may convert this phrase to an altitude value, range, and/or threshold that corresponds to the description provided by that phrase. In doing so, altitude module 112 may access an external database and/or other database storage that may store and/or maintain altitude data of various buildings, mountains, etc. of the specified region. In another example, an altitude parameter may include an address that may specify a place located on a certain floor level (e.g., 17$^{th}$ floor) of a building. In such a case, altitude module 112 may convert this address to an altitude value, range, and/or threshold related to that floor level based on the altitude data stored in an external database and/or other database storage.

In some implementations, a content provider may determine or otherwise provide one or more altitude attributes associated with content. In this manner, the content provided by the content provider and received by computer 110 may already have altitude attributes embedded in the content. For example, the content may have been created using a device (e.g., a mobile device) with a barometric pressure sensor that may be used to capture one or more altitude attributes at the time of creation of the content. In this case, the captured altitude attributes may be embedded into the content. In another example, the creator of the content may manually input one or more altitude attributes which may be embedded into the content.

In some implementations, a content provider may not determine or otherwise provide one or more altitude attributes associated with content. Computer 110 may receive from the content provider the content not yet associated with an altitude attribute. In such a case, altitude module 112 may be configured to determine one or more altitude attributes related to the content.

In some implementations, altitude module 112 may determine the one or more altitude attributes related to the content based on a correlation between the content and other content that are currently associated with one or more altitude attributes. For example, a content creator may have created content via a content provider at a particular geographical location and manually tagged the content with one or more altitude attributes. The content consumer subsequently posts new content at the same geographical location but does not provide altitude information related to the new content. In this case, altitude module 112 may determine that the subsequent content should be associated with the same altitude attributes as the previous content because they share a common geographical location with one another and have been created by the same content creator.

In some implementations, altitude module 112 may determine the one or more altitude attributes related to the content based on address information related to the content. For example, the geo-tag of the content and/or the content itself may include address information from which altitude module 112 may retrieve one or more altitude attributes. If the address specifies a particular floor level of a building, altitude module 112 may convert this address to an altitude value corresponding to that floor level based on altitude data stored in an external database and/or other database storage.

Ambient condition module 113 may be configured to identify and/or obtain one or more ambient condition parameters that specify one or more ambient condition attributes related to content. Ambient conditions may include weather-related information such as temperature, humidity, air pressure, wind velocity and/or other environmental conditions. The one or more ambient condition parameters may be user-specified and/or system-generated. For example, a content consumer may specify an ambient condition parameter to search for geofeed content that is associated with one or more ambient condition attributes that meet the criteria defined by the ambient condition parameter.

An ambient condition parameter may be specified in various forms. It may be defined as a value of a particular ambient condition (e.g., temperature of 90° F.), as a range (e.g., from 30° F. to 40° F.), and/or as a minimum/maximum threshold (e.g., below/above 90° F.). In some implementations, an ambient condition parameter may specify a condition caused by weather variations (e.g., heat wave). For example, a content consumer may request geofeed content created during a heat wave.

In some implementations, a content provider may determine or otherwise provide one or more ambient condition attributes associated with content. In this manner, the content provided by the content provider and received by computer 110 may already have ambient condition attributes embedded in the content. For example, the content provider may access an external database and/or other database storage to acquire one or more ambient condition attributes related to the content. Ambient conditions may be location-specific and/or time-specific, which means that ambient conditions may be conditions measured at a particular location and/or at a particular time. Thus, the content provider may query the external database (and/or other database storage) based on one or more geo-locations specified for a geofeed (and/or the geo-tag associated with the content) and/or a creation/update time of the content. In another example, one or more ambient condition attributes related to content may be manually input by the creator of the content. In yet another example, the content may have been created using a device (e.g., a mobile device) including one or more sensors that may capture one or more ambient condition attributes of where the device is located. In this case, the captured ambient condition attributes may be embedded into the content.

In some implementations, a content provider may not determine or otherwise provide one or more ambient condition attributes associated with content. Computer 110 may receive from the content provider the content not yet associated with an ambient condition attribute. In such a case, ambient condition module 113 may be configured to determine one or more ambient condition attributes related to the content.

In some implementations, ambient condition module 113 may determine the one or more ambient condition attributes related to the content by accessing an external database and/or other database storage that stores and/or maintains information related to ambient conditions. Ambient condition module 113 may obtain the one or more ambient condition attributes from the external database and/or other database storage based on the geo-locations specified for creating a geofeed (and/or the geo-tag associated with the content) and/or a creation/update time of the content.

In some implementations, when an ambient condition parameter specifies a condition caused by weather variations (e.g., a heat wave), a content provider and/or ambient condition module 113 may search the external database and/or other database storage to obtain average ambient conditions (e.g., seasonal average temperature) based on one or more geo-locations specified for the geofeed (and/or the geo-tag associated with the content). The average ambient conditions may be compared to ambient conditions measured at a creation/update time of the content. For example, if the difference between the average temperature and the temperature measured at the creation/update time of the content is sufficiently large (e.g., above a certain threshold), ambient condition module 113 may determine that the content was created during a heat wave. In this example, the resulting geofeed content may include only the content that was created during a heat wave, allowing the content consumer to track this type of variation in weather.

Orientation module 114 may be configured to identify and/or obtain one or more orientation parameters that specify one or more orientation attributes related to the content. The one or more orientation parameters may be user-specified and/or system-generated. For example, a content consumer may specify an orientation parameter to search for geofeed content that is associated with one or more orientation attributes that meet the criteria defined by the orientation parameter. In other words, the content consumer may request a geofeed having content that was created with respect to a particular spatial orientation.

An orientation parameter may be specified in various forms. It may be defined as a reference point from which content was created. The reference point may include a particular point of interest (e.g., "facing the White House"), a particular reference direction (e.g., "facing Southeast"), and/or a particular azimuth value (e.g., "Azimuth of 125 degrees"). For example, videos taken while facing a reference point or images of celestial object viewed from a location at particular angles may be included in the geofeed content.

In some implementations, a content provider may determine or otherwise provide one or more orientation attributes associated with content. In this manner, the content provided by the content provider and received by computer 110 may already have orientation attributes embedded in the content. For example, the content provider may obtain one or more orientation attributes from a device (e.g., a mobile device) that is used to create the content. In this example, the device location may be determined by a GPS unit of the device. Based on the device location, the device orientation may be determined by obtaining compass data and/or accelerometer data from a compass and/or accelerometer/tilt angle sensor linked to the device. In this case, the device location and orientation information may be embedded into the content. In another example, the creator of the content may manually input one or more orientation attributes which may be embedded into the content. The content creator may indicate that the content has been created while facing the White House, for example.

In some implementations, a content provider may not determine or otherwise provide one or more orientation attributes to be associated with content. Computer 110 may receive from the content provider the content not yet associated with an orientation attribute. In such a case, orientation module 114 may be configured to determine one or more orientation attributes related to the content. For example, orientation module 114 may analyze the content and determine whether the content itself indicates a particular reference point. In this example, if the content shows a picture of the White House while the geo-location specified for creating a geofeed (and/or the geo-tag associated with the content) is near the location of the White House, orientation module 114 may determine that that the picture was taken while facing the White House.

Communication module 115 may be configured to communicate the geofeed comprising the content that is associated with one or more altitude attributes, ambient condition attributes, and/or orientation attributes, and/or other attributes that meet the criteria defined by the one or more geofeed parameters. The geofeed may be communicated to the content consumer via the user interface communicated via user interface module 116 and/or other communication channel.

Exemplary screenshots of interfaces for generated by user interface module 116 are illustrated in FIGS. 3-6.

Those having skill in the art will recognize that computer 110 and content consumer device 160 may each comprise one or more processors, one or more interfaces (to various peripheral devices or components), memory, one or more storage devices, and/or other components coupled via a bus. The memory may comprise random access memory (RAM), read only memory (ROM), or other memory. The memory may store computer-executable instructions to be executed by the processor as well as data that may be manipulated by the processor. The storage devices may comprise floppy disks, hard disks, optical disks, tapes, or other storage devices for storing computer-executable instructions and/or data.

One or more applications, including various modules, may be loaded into memory and run on an operating system of computer 110 and/or consumer device 160. In one implementation, computer 110 and consumer device 160 may each comprise a server device, a desktop computer, a laptop, a cell phone, a smart phone, a Personal Digital Assistant, a pocket PC, or other device.

Network 102 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

Figure 2:
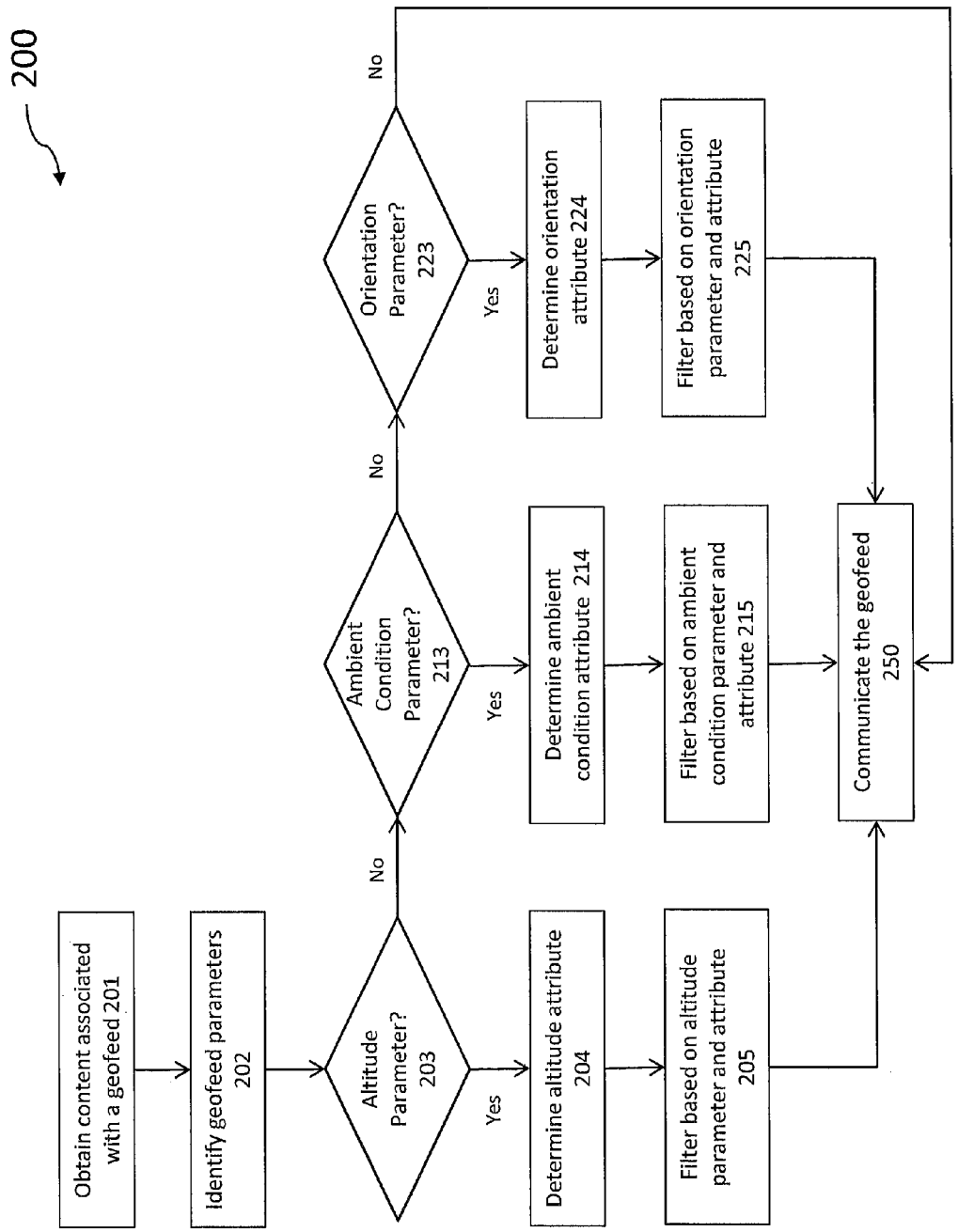
FIG. 2 illustrates a process for generating a geofeed based on one or more geofeed parameters including altitude parameters, ambient condition parameters, and orientation parameters, according to an aspect of the invention.

FIG. 2 illustrates a process 200 for generating a geofeed based on one or more geofeed parameters including altitude parameters, ambient condition parameters, and orientation parameters, according to an aspect of the invention. The various processing operations and/or data flows depicted in FIG. 2 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 201, process 200 may include obtaining content associated with a geofeed. The geofeed may be created and/or retrieved by computer 110.

In an operation 202, process 200 may include identifying and/or selecting one or more geofeed parameters which may include an altitude parameter (e.g., at a certain altitude, within a certain altitude range, below/above a certain altitude, etc.), an ambient condition parameter (e.g., at a certain temperature, within a certain temperature range, below/above a certain temperature, etc.), and an orientation parameter (e.g., "facing Southeast," "Azimuth of 125 degrees," "facing the White House," etc.), and/or other parameters. The one or more geofeed parameters may be used to filter content into the geofeed and/or out of the geofeed.

In an operation 203, process 200 may include determining whether the one or more geofeed parameters include an altitude parameter. If process 200 determines that the one or more geofeed parameters include an altitude parameter, process 200 may include determining one or more altitude attributes related to the content in an operation 204. On the other hand, if the one or more geofeed parameters do not include an altitude parameter, process 200 may include determining whether the one or more geofeed parameters include an ambient condition parameter in an operation 213.

In operation 213, if process 200 determines that the one or more geofeed parameters include an ambient condition parameter, process 200 may include determining one or more ambient condition attributes related to the content in an operation 214. On the other hand, if the one or more geofeed parameters do not include an ambient condition parameter, process 200 may include determining whether the one or more geofeed parameters include an orientation parameter in an operation 223.

In operation 223, if process 200 determines that the one or more geofeed parameters include an orientation parameter, process 200 may include determining one or more orientation attributes related to the content in an operation 224. On the other hand, if the one or more geofeed parameters do not include an orientation parameter, process 200 may proceed to an operation 250.

In an operation 205, process 200 may include filtering the content into the geofeed and/or out of the geofeed based on the altitude parameter and the one or more altitude attributes related to the content. For example, if a content item is associated with an altitude value that falls outside of the altitude range identified by the altitude parameter, the content item may be filtered out (or excluded) from the geofeed.

In an operation 215, process 200 may include filtering the content into the geofeed and/or out of the geofeed based on the ambient condition parameter and the one or more ambient condition attributes related to the content. For example, if a content item is associated with a temperature value that does not satisfy the ambient condition parameter (e.g., above 95° F.), the content item may be filtered out (or excluded) from the geofeed.

In an operation 225, process 200 may include filtering the content into the geofeed and/or out of the geofeed based on the orientation parameter and the one or more orientation attributes related to the content. For example, if a content item has been created while facing a particular direction that is not the same as the direction identified by the orientation parameter, the content item may be filtered out (or excluded) from the geofeed.

In an operation 250, process 200 may include communicating the geofeed comprising the filtered content. The geofeed having filtered content may be communicated via one or more communication channels such as, for example, SMS text, email, content delivered to a client application such as a mobile application, a website, and/or other communication channel. In some implementations, the geofeed may be communicated via a user interface such as a web page, mobile application, and/or other interface.

Figure 3:
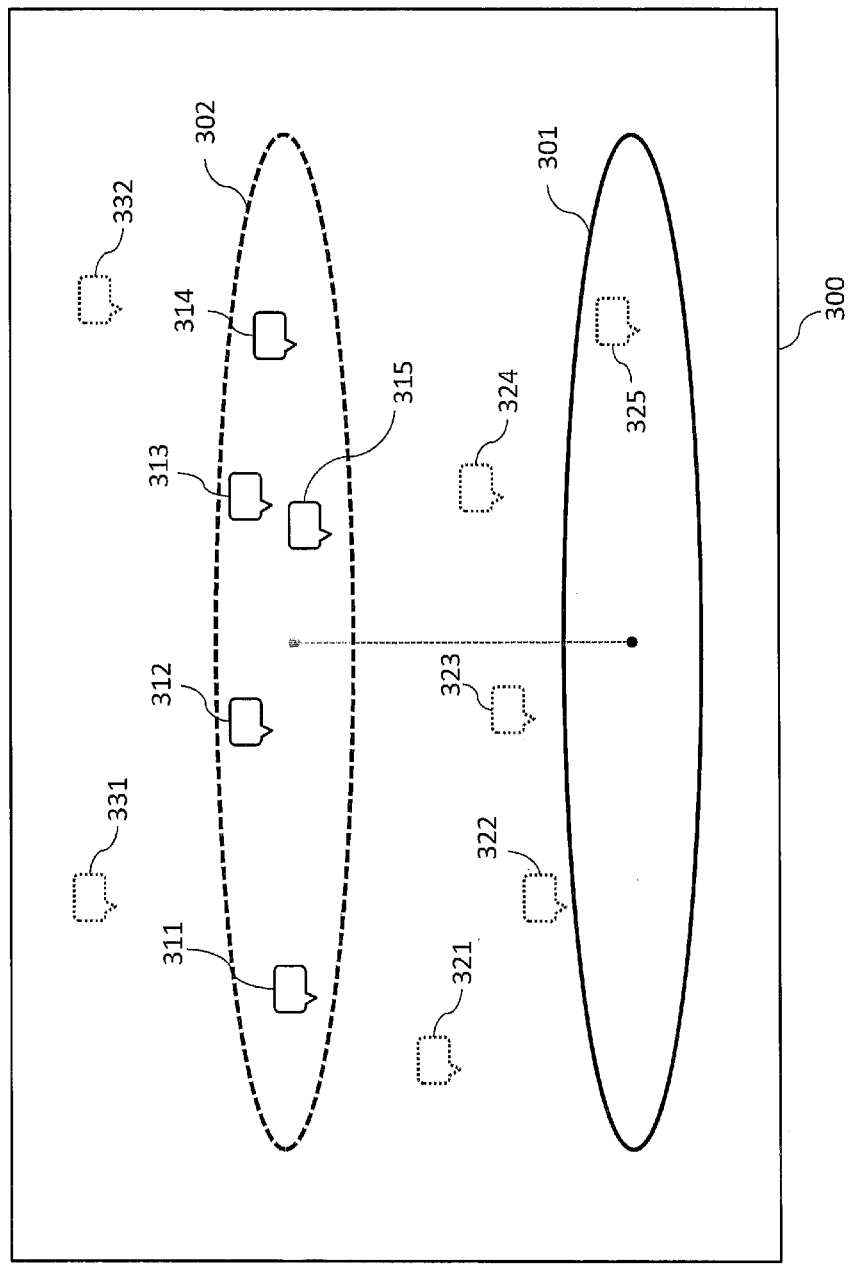
FIG. 3 illustrates a screenshot of an interface for communicating a geofeed including content associated with an altitude attribute that corresponds to an altitude value defined by an altitude parameter, according to an aspect of the invention.

FIG. 3 illustrates a screenshot of an interface 300 for communicating a geofeed including content associated with an altitude attribute that corresponds to an altitude value defined by an altitude parameter, according to an aspect of the invention. The screenshots illustrated in FIG. 3 and other drawing figures are for illustrative purposes only. Various components may be added, deleted, moved, or otherwise changed so that the configuration, appearance, and/or content of the screenshots may be different than as illustrated in the figures. Accordingly, the graphical user interface objects as illustrated (and described in greater detail below) are exemplary by nature and, as such, should not be viewed as limiting.

Interface 300 and other interfaces described herein may be implemented as a web page communicated from computer 110 to a client, an application such as a mobile application executing on the client that receives generates the interface based on information communicated from computer 110, and/or other interface. Whichever type of interface is used, computer 110 may communicate the data and/or formatting instructions related to the interface to the client, causing the client to generate the various interfaces of FIG. 3 and other drawing figures. Furthermore, computer 110 may receive data from the client via the various interfaces, as would be appreciated.

Referring to FIG. 3, interface 300 may include a geofeed (as illustrated as a circle 301 in solid line) having content items 311-315, 321-325, and 331-332 whose latitude and longitude coordinates reside within a geo-location specified for the geofeed. Individual content items 311-315, 321-325, and 331-332 may be associated with one or more altitude attributes. For example, content item 325 may be associated with an altitude value of zero.

When a content consumer makes a request to create a geofeed based on one or more geo-locations, the content consumer may also specify an altitude parameter which indicates a particular altitude value. Interface 300 may include a circle 302 (in dotted line) that may indicate the geofeed having content items 311-315 (shown in solid line) that are associated with the particular altitude value identified by the altitude parameter. Content items 321-325 and 331-332 associated with altitude values that are different from the altitude parameter may be displayed differently (e.g., in dotted line) from content items 311-315 and/or may be filtered out (or excluded) from the geofeed. The geofeed comprising the filtered content (as illustrated as circle 302 and content items 311-315) may be communicated via interface 300 to the content consumer.

Figure 4:
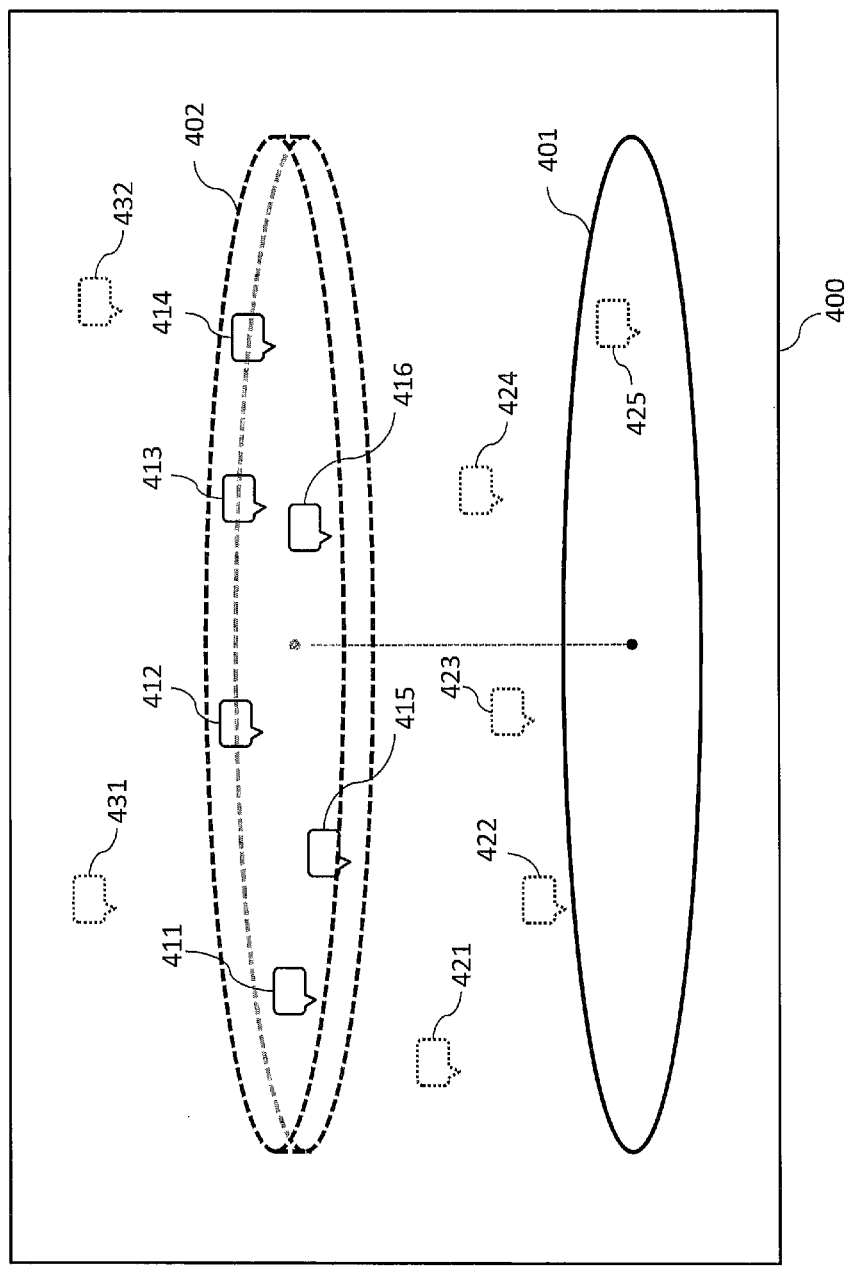
FIG. 4 illustrates a screenshot of an interface for communicating a geofeed including content associated with an altitude attribute that is within an altitude range defined by an altitude parameter, according to an aspect of the invention.

FIG. 4 illustrates a screenshot of an interface 400 for communicating a geofeed including content associated with an altitude attribute that is within an altitude range defined by an altitude parameter, according to an aspect of the invention.

Referring to FIG. 4, interface 400 may include a geofeed (as illustrated as a circle 401 in solid line) having content items 411-416, 421-425, and 431-432 whose latitude and longitude coordinates reside within a geo-location specified for the geofeed. Individual content items 411-416, 421-425, and 431-432 may be associated with one or more altitude attributes. For example, content item 425 may be associated with an altitude value of zero.

When a content consumer makes a request to create a geofeed based on one or more geo-locations, the content consumer may also specify an altitude parameter which indicates a particular altitude range. Interface 400 may include a cylinder 402 (in dotted line) that may indicate the geofeed having content items 411-416 where content items 411-416 (shown in solid line) may be associated with altitude values that are within the particular altitude range identified by the altitude parameter. Content items 421-425 and 431-432 associated with altitude values that fall outside of the altitude range identified by the altitude parameter may be displayed differently (e.g., in dotted line) from content items 411-416 and/or may be filtered out (or excluded) from the geofeed. The geofeed comprising the filtered content (as illustrated as cylinder 402 and content items 411-416) may be communicated via interface 400 to the content consumer.

Figure 5:
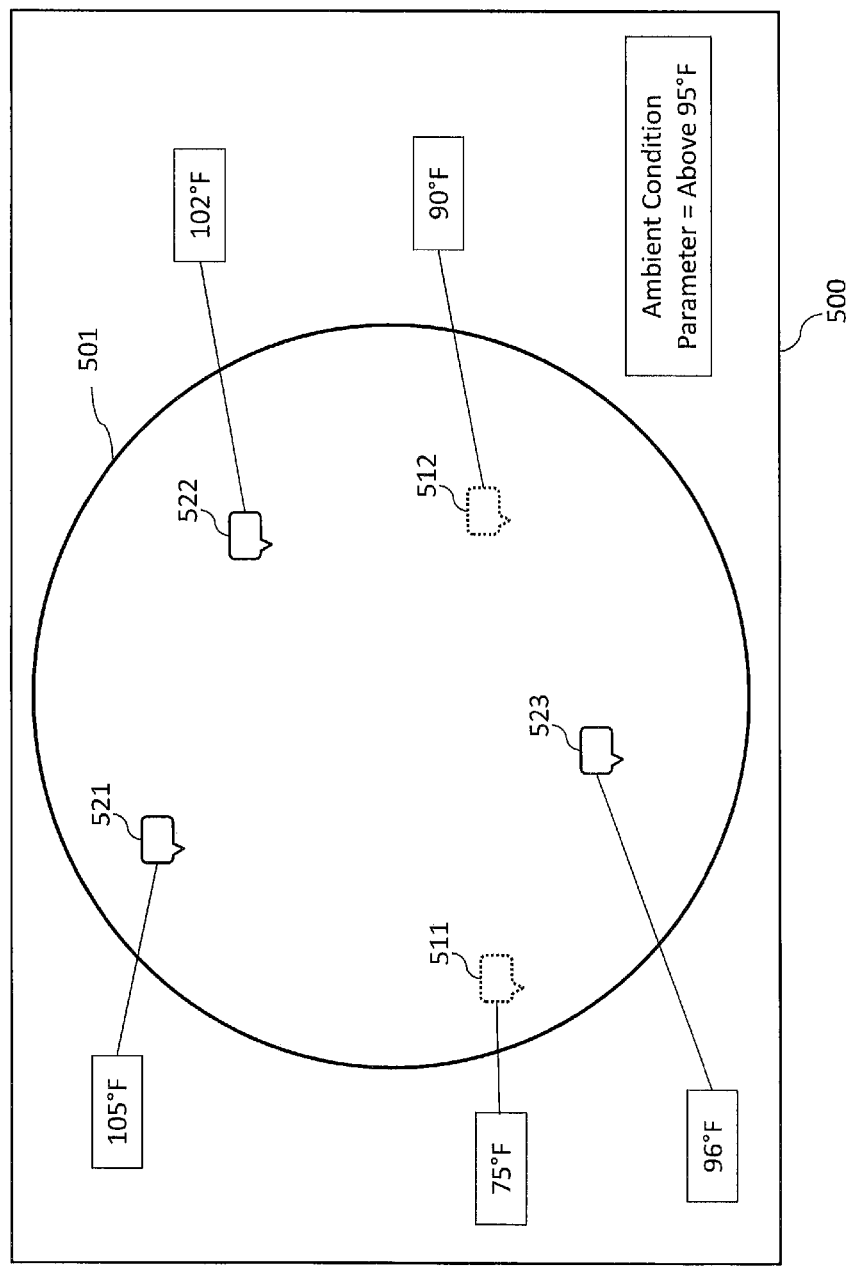
FIG. 5 illustrates a screenshot of an interface for communicating a geofeed including content associated with an ambient condition attribute that satisfies an ambient condition parameter, according to an aspect of the invention.

FIG. 5 illustrates a screenshot of an interface 500 for communicating a geofeed including content associated with an ambient condition attribute that satisfies an ambient condition parameter, according to an aspect of the invention.

Referring to FIG. 5, interface 500 may include a geofeed (as illustrated as a circle 501) having content items 511, 512, 521, 522, and 523 whose latitude and longitude coordinates reside within a geo-location specified for the geofeed. Individual content items 511, 512, 521, 522, and 523 may be associated with one or more ambient condition attributes. For example, content item 521 may be associated with a temperature value of 105° F.

When a content consumer makes a request to create a geofeed based on one or more geo-locations, the content consumer may also specify an ambient condition parameter (e.g., at a certain temperature, within a certain temperature range, below/above a certain temperature, etc.). For example, a content consumer may search for geofeed content that have been created when the temperature was above 95° F. In this example, interface 500 may display a geofeed having content items 521, 522, and 523 (shown in solid line) where content items 521, 522, and 523 are associated with a temperature value that is above 95° F. (therefore satisfies the ambient condition parameter). On the other hand, content items 511 and 512 associated with temperature values that are below 95° F. (therefore does not satisfy the ambient condition parameter) may be displayed differently (e.g., in dotted line) from content items 521, 522, and 523 and/or may be filtered out (or excluded) from the geofeed. The geofeed comprising the filtered content (as illustrated as circle 501 and content items 521, 522, and 523) may be communicated via interface 500 to the content consumer.

Figure 6:
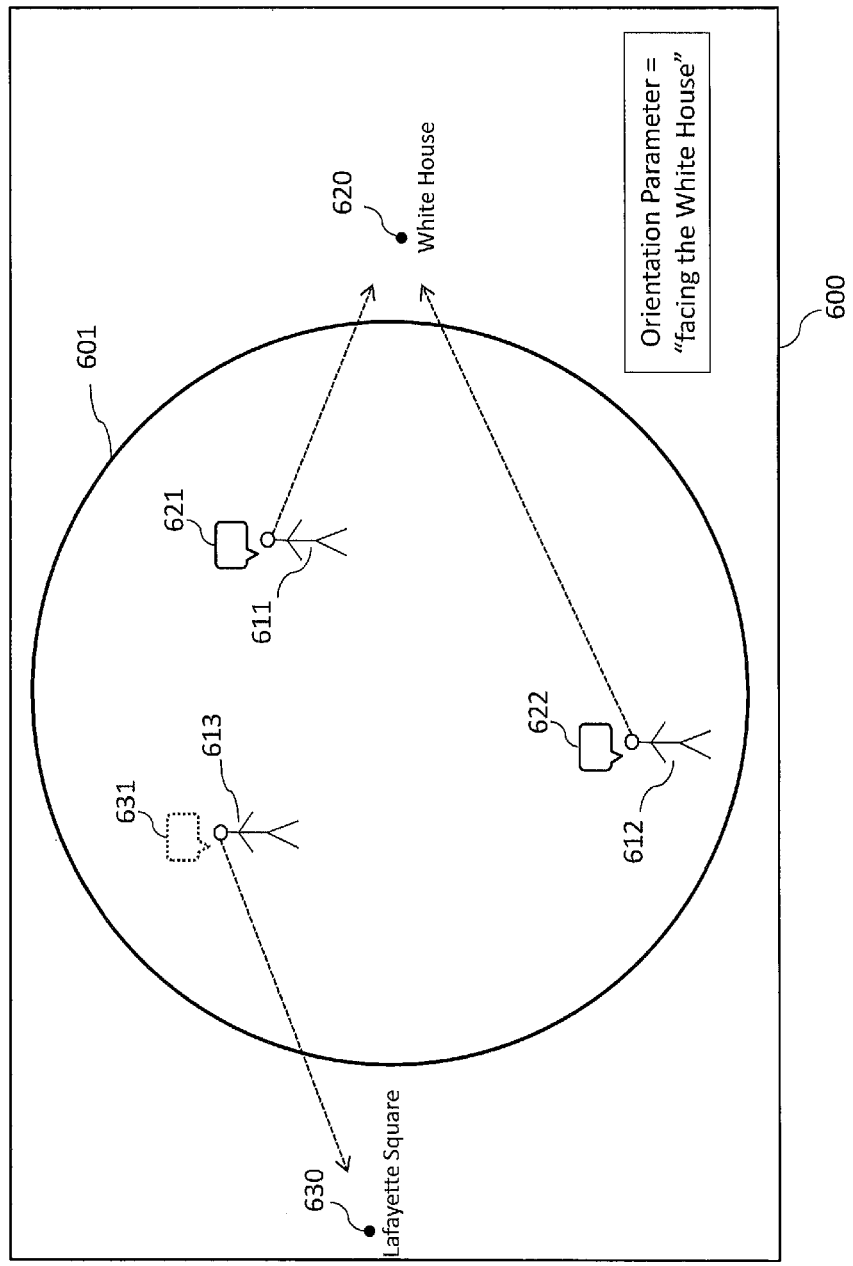
FIG. 6 illustrates a screenshot of an interface for communicating a geofeed including content associated with an orientation attribute that satisfies an orientation parameter, according to an aspect of the invention.

FIG. 6 illustrates a screenshot of an interface 600 for communicating a geofeed including content associated with an orientation attribute that satisfies an orientation parameter, according to an aspect of the invention.

Referring to FIG. 6, interface 600 may include a geofeed (as illustrated as a circle 601) having content items 621, 622, and 631 which have been created by content creators 611, 612, and 613, respectively. Individual content items 611, 612, and 613 may be associated with one or more orientation attributes. For example, content item 621 may be associated with a reference point 620 because content creator 611 created content item 621 while facing reference point 620.

When a content consumer makes a request to create a geofeed based on one or more geo-locations, the content consumer may also specify an orientation parameter (e.g., "facing the White House," "facing Southeast," "Azimuth of 125 degrees," etc.). For example, a content consumer may search for geofeed content that have been created while facing the White House (illustrated as reference point 620). In this example, interface 600 may display a geofeed having content items 621 and 622 (shown in solid line) where content items 621 and 622 were created while content creators 611 and 612 were facing the White House (therefore satisfies the orientation parameter). On the other hand, content item 631 which has been created by content creator 613 while facing the Lafayette Square (illustrated as a reference point 630) (therefore does not satisfy the orientation parameter) may be displayed differently (e.g., in dotted line) from content items 621 and 622 and/or may be filtered out (or excluded) from the geofeed. The geofeed comprising the filtered content (as illustrated as circle 601 and content items 621 and 622) may be communicated via interface 600 to the content consumer.

Figure 7:
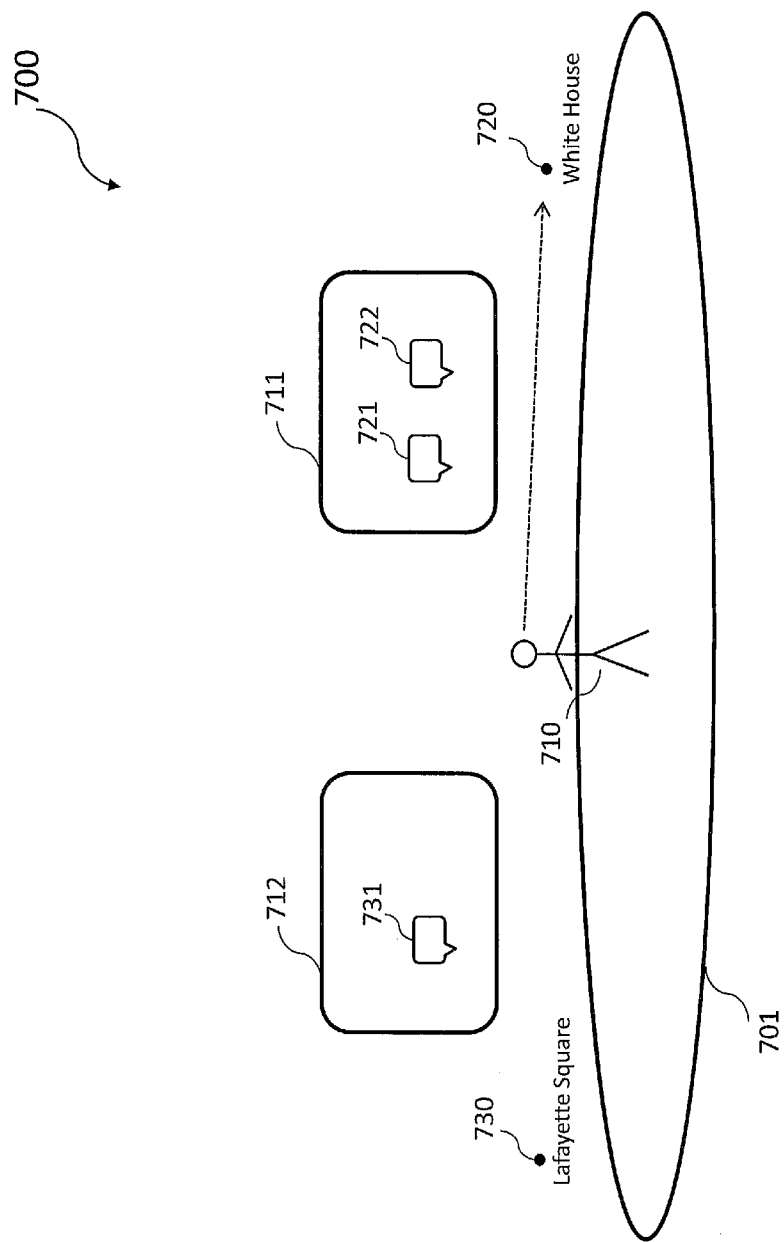
FIG. 7 illustrates a graphical representation of generating a plurality of views of geofeed content based on location and orientation data, according to an aspect of the invention.

FIG. 7 illustrates a graphical representation 700 of generating a plurality of views of geofeed content based on location and orientation data, according to an aspect of the invention.

Referring to FIG. 7, graphical representation 700 may include a geofeed (as illustrated as a circle 701) having content items 721, 722, and 731. Content items 721 and 722 may be associated with an orientation attribute that is common to each other (e.g., a reference point 720) whereas content items 731 may be associated with a different orientation attribute (e.g., a reference point 730). For example, the creator of content item 731 may have created content item 731 while facing the Lafayette Square (illustrated as reference point 730) while the creators of content items 721 and 722 may have created content items 721 and 722 while facing the White House (illustrated as reference point 720).

A content consumer 710 visits the President's Park in Washington D.C. and searches for geofeed content around the area using a mobile device. Based on the device location (which may be determined by a GPS unit of the device) and the device orientation (which may be determined by obtaining compass data and/or accelerometer data from a compass and/or accelerometer/tilt angle sensor linked to the device), content consumer 710 may obtain different views of the geofeed content. For example, if content consumer 710 holds the device facing the White House (illustrated as reference point 720), content consumer 710 may get a front-view 711 which displays content items 721 and 722, a rear-view 712 which displays content item 731, and/or other views.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method for generating a geofeed based on one or more altitude parameters, the method being implemented in a computer that includes one or more processors programmed by computer program instructions, the method comprising:

obtaining, by one or more processors programmed by computer program instructions, content that is aggregated from a plurality of social media content providers based on one or more geographically definable locations, the content being provided by the plurality of social media content providers based on respective requests formatted specifically for individual ones of the plurality of social media content providers, wherein the respective requests comprise a first request in a first format accepted by a first social media content provider and a second request in a second format accepted by a second social media content provider, the first format being different than the second format, the content includes first content from the first social media provider and second content from the second social media content provider, and wherein the respective requests comprise the one or more geographically definable locations;

identifying, by the one or more processors, the one or more altitude parameters used to filter the content based on an altitude at which the content was created;

determining, by the one or more processors, one or more altitude attributes that indicate the altitude at which the content was created;

causing, by the one or more processors, the content to be filtered in or out based on the one or more altitude parameters and the one or more altitude attributes; and communicating, by the one or more processors, the filtered content.

2. The method of claim 1, wherein the one or more altitude parameters are obtained based on a request for the content from a user.

3. The method of claim 1, wherein the one or more altitude attributes related to the first content are determined by the first content provider such that the first content is associated with the one or more altitude attributes when received from the first content provider.

4. The method of claim 3, wherein the one or more altitude attributes are generated by a barometric pressure sensor of a device, wherein the device is used to create the first content.

5. The method of claim 3, wherein the one or more altitude attributes are generated by a content creator who created the first content.

6. The method of claim 1, wherein the one or more altitude attributes related to the first content are not provided by the first content provider, the method further comprising:
automatically determining, by the one or more processors, the one or more altitude attributes related to the content after the content is received from the first content provider.

7. The method of claim 6, the method further comprising:
generating, by the one or more processors, a correlation between the first content and other content that is associated with one or more altitude attributes, wherein the other content is known to be created at an altitude indicated by the one or more altitude attributes; and
wherein the one or more altitude attributes are automatically determined based on the correlation.

8. The method of claim 6, the method further comprising:
identifying, by the one or more processors, address information related to the first content, wherein the one or more altitude attributes are automatically determined based on the address information.

9. A system for generating a geofeed based on one or more altitude parameters, the system comprising:
one or more processors programmed by computer program instructions to:
obtain content associated with the geofeed, the content aggregated from a plurality of social media content providers based on one or more geographically definable locations, the content being provided by the plurality of social media content providers based on respective requests formatted specifically for individual ones of the plurality of social media content providers, wherein the respective requests comprise a first request in a first format accepted by a first social media content provider and a second request in a second format accepted by a second social media content provider, the first format being different than the second format, and wherein the respective requests comprise the one or more geographically definable locations;
identify the one or more altitude parameters used to filter the content based on an altitude at which the content was created;
determine one or more altitude attributes that indicate an altitude at which the content was created;
cause the content to be filtered in or out based on the one or more altitude parameters and the one or more altitude attributes; and
communicate the filtered content.

10. The system of claim 9, wherein the one or more altitude parameters are obtained based on a request for the content from a user.

11. The system of claim 9, wherein the one or more altitude attributes related to the first content are determined by the first content provider such that the first content is associated with the one or more altitude attributes when received from the first content provider.

12. The system of claim 11, wherein the one or more altitude attributes are generated by a barometric pressure sensor of a device, wherein the device is used to create the first content.

13. The system of claim 11, wherein the one or more altitude attributes are generated by a content creator who created the first content.

14. The system of claim 9, wherein the one or more altitude attributes related to the content are not provided by the first content provider, the one or more processors further programmed to:
automatically determine the one or more altitude attributes related to the content after the first content is received from the first content provider.

15. The system of claim 14, wherein the one or more processors are further programmed to:
generate a correlation between the first content and other content that is associated with one or more altitude attributes, wherein the other content is known to be created at an altitude indicated by the one or more altitude attributes; and
wherein the one or more altitude attributes are automatically determined based on the correlation.

16. The system of claim 14, wherein the one or more processors are further programmed to:
identify address information related to the first content, wherein the one or more altitude attributes are automatically determined based on the address information.

17. A method for generating a geofeed based on one or more geofeed parameters, the method being implemented in a computer that includes one or more processors configured to execute one or more processors programmed by computer program instructions, the method comprising:
obtaining, by one or more processors programmed by computer program instructions, content associated with the geofeed, the content aggregated from a plurality of social media content providers based on one or more geographically definable locations, the content being provided by the plurality of social media content providers based on respective requests formatted specifically for individual ones of the plurality of social media content providers, wherein the respective requests comprise a first request in a first format accepted by a first social media content provider and a second request in a second format accepted by a second social media content provider, the first format being different than the second format, and wherein the respective requests comprise the one or more geographically definable locations;
obtaining, by the one or more processors, the one or more geofeed parameters, wherein the one or more geofeed parameters comprise: (i) one or more ambient condition parameters used to filter the content based on an ambient condition that existed at the time that the content was created, or (ii) one or more orientation parameters used to filter the content based on an orientation of a device used to create the content; and
communicating, by the one or more processors, the content that is filtered in or out based on the one or more geofeed parameters.

18. The method of claim 17, wherein the method further comprising:
identifying, by one or more processors, the one or more ambient condition parameters;
determining, by the one or more processors, one or more ambient condition attributes that indicate the ambient condition that existed at the time that the was created; and
causing, by the one or more processors, the content to be filtered in or out based on the one or more ambient condition parameters and the one or more ambient condition attributes.

19. The method of claim 17, the method further comprising:

identifying, by one or more processors, the one or more orientation parameters;

determining, by the one or more processors, one or more orientation attributes that indicate the orientation of the device that created the content; and causing, by the one or more processors, the content to be filtered in or out based on the one or more orientation parameters and the one or more orientation attributes.

20. The method of claim 7, wherein the first content was created by a content creator and the other content was created by the content creator at a different time such that the first content does not include the one or more altitude attributes and the other content does include the one or more altitude attributes.

21. The method of claim 8, the method further comprising:
determining, by the one or more processors, based on the address information, a floor level from which the first content was created, wherein the one or more altitude attributes are automatically determined based on the determined floor level.

22. The system of claim 15, wherein the first content was created by a content creator and the other content was created by the content creator at a different time such that the first content does not include the one or more altitude attributes and the other content does include the one or more altitude attributes.

23. The system of claim 16, wherein the one or more processors are further programmed to:
determine, based on the address information, a floor level from which the first content was created, wherein the one or more altitude attributes are automatically determined based on the determined floor level.

24. The method of claim 18, wherein the first content comprises content that was created when a first ambient condition existed and content that was created when a second ambient condition different than the first ambient condition existed, the method further comprising:
displaying, by the one or more processors, the content that was created when the first ambient condition existed differently than the content that was created when the second ambient condition existed.

25. The method of claim 18, wherein the one or more ambient attributes related to the first content are not provided by the first content provider, the method further comprising:
automatically determining, by the one or more processors, the one or more ambient condition attributes after the first content is received from the first content provider.

26. The method of claim 25, wherein automatically determining the one or more ambient condition attributes comprises:
identifying, by the one or more processors, a date and/or time when the first content was created;
identifying, by the one or more processors, a geo-location where the first content was created; and
determining, by the one or more processors, an ambient condition that existed at the identified geo-location during the identified date and/or time.

27. The method of claim 19, wherein the one or more orientation attributes related to the first content are not provided by the first content provider, the method further comprising:
automatically determining, by the one or more processors, the one or more orientation attributes after the first content is received from the first content provider.

28. The method of claim 27, wherein the first content comprises an image, and wherein automatically determining the one or more orientation attributes comprises:
recognizing, by the one or more processors, a landmark captured on the image; and
determining, by the one or more processors, that the image was taken while facing the landmark based on the landmark recognition.

29. The method of claim 19, the method further comprising:
receiving, by the one or more processors, a current orientation of a user;
receiving, by the one or more processors, a current geo-location of the user;
identifying, by the one or more processors, a set of content that was created within a proximity of the current geo-location of the user, wherein the set of content includes content created with the same orientation as the current orientation of the user and/or different orientation than the current orientation;
providing, by the one or more processors, the set of content to the user.

30. The method of claim 29, the method further comprising:
receiving, by the one or more processors, from the user, a selection of a given orientation different than the current orientation; and
providing, by the one or more processors, at least one of the set of content that corresponds to the given orientation.

* * * * *